United States Patent Office 3,517,973
Patented June 30, 1970

3,517,973
DEVICE FOR SUPPORTING TWO ELEMENTS MOVABLY WITH RESPECT TO EACH OTHER
Gilles Gerardus Hirs, Beeuwijk, Netherlands, assignor to Nederlandse Organisatie voor Toegepast-Natuurwetenschappelijk Onderzoek ten behoeve van Nijverheid, Handel en Verkeer, The Hague, Netherlands, a corporation of the Netherlands
Continuation of application Ser. No. 550,779, May 17, 1966. This application Sept. 18, 1968, Ser. No. 768,592
Claims priority, application Netherlands, May 21, 1965, 6506474
Int. Cl. F16c 1/24, 17/16
U.S. Cl. 308—9    3 Claims

ABSTRACT OF THE DISCLOSURE

A device for supporting two elements movably with respect to each other, comprising a bearing surface on each of the two elements and means for the local supply of a pressurized medium for transmitting the carrying load, to the slit-shaped space which is present during the normal operation of the device and which is open at least as to part of its periphery, the said slit-shaped space comprising a first region and a second region, the first region separating the second region from the open periphery of the slit-shaped space and the second region, which is in some degree less resistant to the flow of the medium, separating the first region from the place where the medium is supplied.

---

Figure 1:
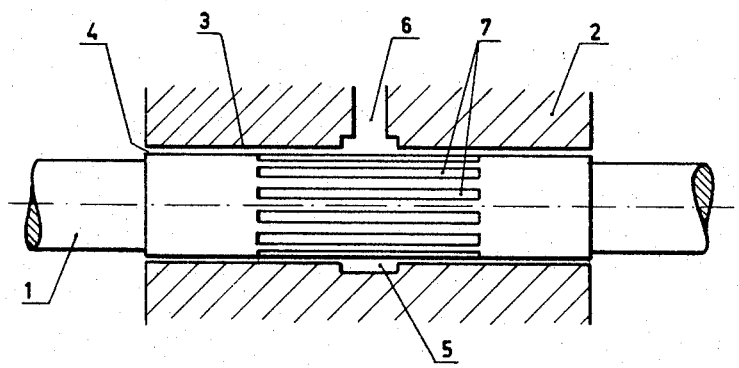

This application is a streamline continuation of 550,779, filed May 17, 1966, now abandoned.

Devices of this kind are known in the shape of journal bearings. These bearings comprise a bore having an annular recess in the middle, to which is connected the supply of the medium, which, in dependency on the application of the bearing, may be a liquid or a gas. The diameter of the shaft supported in this bore is stepped on either side of the annular recess, so that the slit-shaped space between the shaft and the bore has a larger width near said recess than it has near the ends of the bore.

When the pressurized medium is supplied to the annular recess, and the shaft is situated centrically in the bore, there will arise within the medium present in the slit a rotation-symmetrical pressure, which progressively decreases towards the ends of the bearing. At an excentric position of the shaft in the bore the rotation-symmetry of the pressure will disappear and there will arise differences in pressure over the periphery, resulting in a force, which is opposite to the excentricity. Herefrom the bearing derives its carrying capacity, also when at a standstill.

With such a bearing having a stepped slit, the differences in pressure over the periphery will, especially at larger width-diameter ratios of the bearing, be small owing to short-circuit currents in tangential direction in the regions with smaller resistance to the flow of the medium, i.e. at the location of the wider sections of the slit, which short-circuit currents counteract the arising of the pressure distribution supplying the load carrying capacity.

OBJECTS OF THE INVENTION

It is the object of the invention to provide an improved device for supporting two elements movably with respect to each other, in which device the hydro- or aerostatic pressure distribution results in a larger load carrying capacity than in similar devices, in which the principles of the known bearing are applied.

THE INVENTION

To this end the device according to this invention is characterized in that the two bearing surfaces are shaped as each other's equidistants and that the smaller flow resistance in the second region is caused by a number of grooves provided in at least one of the bearing surfaces, the said grooves connecting the location of the medium supply with the first region.

In such a device, when the grooves are suitably dimensioned, the resistance of the flow of the medium from the place of supply to the ungrooved region will be in the same order of magnitude as it is in the corresponding region of a device according to the principle of the known bearing. However, because in the device according to the invention the slit-shaped space between the grooves is just as narrow as it is in the ungrooved region, the short-circuit currents meet with a considerably greater resistance, so that the load carrying capacity resulting from the hydro- or aerostatic pressure distribution is larger.

In addition to this, it has been found that in the device according to the invention, when the two bearing surfaces are in motion with respect to each other, the hydro- or aerodynamic pressure distribution is better and that a better damping activity of the medium in the slit-shaped space is obtained at shock load.

The optimal dimensions of the grooves are to a high degree dependent on the dimensions of the bearing surfaces, the medium employed and the circumstances, under which the device will normally be used. Generally speaking, however, the depth chosen for the grooves should not be larger than ten times the average width of the slit, whilst it is desirable that the ratio of the length of the grooves with respect to their pitch amounts to at least about five.

The device according to the invention may be constructed as a rotating bearing, but also as a bearing for linear movements, e.g. for supporting conveyor belts and guiding strips of extremely flexible material, such as paper.

The invention will be further explained hereinafter, with reference to the accompanying drawing, in which the FIGS. 1 and 2 each show an example of a journal bearing according to the invention.

FIG. 1 shows the bearing of the shaft 1 in a case or machine part 2, which is for this purpose provided with the bore 3. The bore 3 and the section of the shaft 1 which is situated inside of it, show a difference in diameter which is such that, when the two are mounted concentrically, a cylindrical slit 4 with an overall equal width remains. This slit is open at both ends of the bore 3. For clearness sake, the representation of the width of the slit 4 is considerably enlarged.

The middle of the bore 3 is provided with the annular recess 5, into which gives the channel 6. At its other side, this channel 6 is connected to a pump or compressor (not shown in the drawing) for supplying a medium at an overpressure, the medium being preferably oil or air, in dependency on the application of the bearing.

In the shaft 1 there are provided axially directed grooves 7, which extend over about one half of the bearing.

When the shaft 1 is situated centrically in the bore 3, the medium, which is supplied under pressure via the channel 6 and the annular recess 5, will be distributed evenly over the periphery of the slit 4 and flow along the grooved part of the shaft 1, where it meets with relatively little flow resistance, and along the smooth parts of the shaft 1, where the resistance is considerably greater, towards the open ends of the slit 4. The pressure distribution of the medium will then be rotation-symmetric and, therefore, it will not result in a force on the shaft 1. When the shaft 1 is in a noncentrical position with respect to the bore 3, the slit 4 will become narrower in places and will become wider in the places diametrically opposite. Especially in the ungrooved parts of the bearings, the local narrowing of the slit 4 results in an increased flow resistance and an accompanying increase in the pressure of the medium. Diametrically opposite to this, where the slit 4 has become wider, there arises a lower pressure in the medium. The distribution of the pressure is then no longer rotation-symmetrical. The result is that the medium exerts a force on the shaft 1, which force is directed against the excentricity and will increase when the excentricity increases. This force forms the load carrying capacity of the bearing, which, as is evident from the above, is present even when the shaft 1 is at a standstill with respect to the case 2.

As the grooves 7, through which the supply of the medium to the ungrooved regions of the bearing is effected, are separated from each other by slits having the same width occurring elsewhere in the bearing, the tangential flow resistance of the grooved part of the shaft 1 is great, so that no short-circuit currents can exert an adverse influence of any importance on the non-symmetrical pressure distribution at an excentric position of the shaft 1 in the bore 3. Consequenly, the pressure distribution in the grooved regions is similar to that in the ungrooved regions, thus increasing the load carrying capacity of the bearing.

Figure 2:
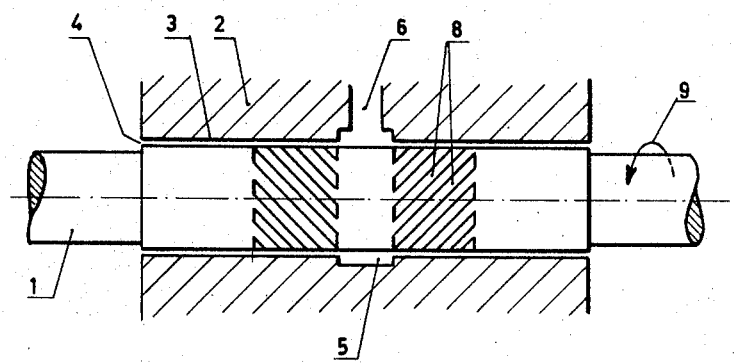

The bearing represented in FIG. 2 in principle corresponds entirely to the bearing according to FIG. 1, the only difference being that in this case the grooves 8 have been provided helically. This bearing is destined for the direction of rotation indicated by the arrow 9.

The main result of the oblique position of the grooves 8 is that a deviation with respect to the concentrical position and the resultant of the differences in pressure arising herefrom, are not oppositely directed, but include an obtuse angle.

This is of importance, when the shaft rotates and the hydro- or aerodynamical of the pressure distribution also plays a part. In the bearing shown in FIG. 2, stability is maintained up to a considerably higher number of revolutions than in the known bearings and than in the bearing of FIG. 1. In this context the expression "stability of the bearing" should be understood to mean the stability of the equilibrium between the external load and the pressure distribution in the lubricating film.

A further advantage of the bearing shown in FIG. 2 is that, when the device is at a standstill or when the velocity of rotation is relatively low, the medium while flowing through will exert a driving force in the direction of rotation on the shaft, which property can be used in such cases, in which the consumption of energy is exclusively or mainly to be put down to a friction in the bearing, as in gyroscopes, centrifuges and viscosity meters.

Both the bearings that have been described are constructed symmetrically with respect to the groove 5 for the supply of the medium, so that they actually constitute a double bearing. It is also possible to leave out one half of the bearing, in which case it is of course necessary to take measures for sealing off the supply of the medium on that side.

I claim:

1. Device for supporting two elements movable with respect to each other, comprising a first bearing member having a transverse bore provided therein, a second cylindrical member received in said bore and rotatable with respect thereto, said first bearing member including an arcuate recessed portion, means for supplying a pressurized medium to said arcuate portion whereby said medium is distributed over the circumferential interface of said cylindrical member, first and second sets of helical grooves disposed on said cylindrical member and divided by a planar portion, radially aligned with said arcuate portion, said helical grooves being angularly disposed in opposite directions, the ratio between the length and pitch of each said grooves being at least five and the depth of said grooves being at most ten times as large as the average width of the space between the bore and said cylindrical member and the width of the grooves is at most half the pitch of the groove, whereby said pressurized medium is transmitted along the circumferential face between said bore and said cylindrical member and said grooves to insure coaxial alignment of the cylindrical member in said bore, said grooves defining an obtuse angle oppositely directed to the direction of rotation of said cylindrical member within said bore.

2. Device for supporting two elements movably with respect to each other comprising a first bearing member having a transverse bore provided therein, a second cylindrical member received in said bore and rotatable with respect thereto, said first bearing member including an arcuate recessed portion, means for supplying a pressurized medium to said arcuate portion whereby said medium is distributed over the circumferential interface of said cylindrical member, grooves disposed in said second member about the circumferential face thereof and extending approximately one-half of the length of the interface between said first member and said second member, said grooves being disposed at substantially the mid-section of said second cylindrical member and aligned with said arcuate recessed portion, the ratio of the length to the pitch of the grooves being at least about 5 and the depth of the grooves being not more than 10 times the average width of the space between the bore and said second member.

3. Device for supporting two elements according to claim 2 in which the grooved area of second member is less than one-half the length of the interface between said first member and said second member.

References Cited

UNITED STATES PATENTS 2,937,908   5/1960   Golten _____ 308—122
3,305,282   2/1967   Arneson _____ 308—122

FRED C. MATTERN, Jr., Primary Examiner

F. SUSKO, Assistant Examiner

U.S. Cl. X.R.

308—122